United States Patent
Baremor

[11] 3,893,351
[45] July 8, 1975

[54] LIMITED SLIP DIFFERENTIAL DRIVE MECHANISM

[75] Inventor: Jerry F. Baremor, Marshall, Mich.
[73] Assignee: Eaton Corporation, Cleveland, Ohio
[22] Filed: June 19, 1973
[21] Appl. No.: 371,479

[52] U.S. Cl. ............................... 74/710.5; 74/711
[51] Int. Cl. ............................................. F16h 1/44
[58] Field of Search ........................... 74/710.5, 711

[56] References Cited
UNITED STATES PATENTS

| 25,500 | 12/1963 | O'Brien | 74/710.5 |
| 2,720,796 | 10/1955 | Schon | 74/711 |
| 2,850,922 | 9/1958 | Welsh | 74/711 |
| 2,855,806 | 10/1958 | Fallon | 74/710.5 |
| 3,364,791 | 1/1968 | Truckle | 74/711 |
| 3,581,601 | 6/1971 | Kitano | 74/711 |

Primary Examiner—Samuel Scott
Assistant Examiner—P. S. Lall
Attorney, Agent, or Firm—Teagno & Toddy

[57] ABSTRACT

An improved differential drive mechanism includes a differential gear train having a pair of side gears which are disposed in meshing engagement with a plurality of pinion gears. Upon the occurrence of a predetermined speed of relative rotation between input and output members of the differential gear train, a speed responsive actuator assembly effects engagement of a clutch assembly to retard the relative rotation. Upon actuation of the clutch assembly, an improved thrust block arrangement transmits a force from one of the side gears to the other side gear independently of the pinion gears. This force is utilized to engage a disc pack in the clutch assembly. The thrust block arrangement includes a pair of circular thrust blocks which are disposed in abutting engagement with each other and the side gears. The two thrust blocks extend through a circular opening formed in a spider which carries the pinion gears.

5 Claims, 3 Drawing Figures

LIMITED SLIP DIFFERENTIAL DRIVE MECHANISM

BACKGROUND OF THE INVENTION

This invention relates generally to a differential drive mechanism.

A known differential drive mechanism is disclosed in U.S. Pat. No. 3,448,636. The differential drive mechanism disclosed in this patent is of the limited slip type and includes a roller clutch assembly which is utilized to drivingly connect side gears of a differential gear train with a carrier in response to a predetermined speed of relative rotation between the side gears and carrier. A thrust block is disposed between the side gears and has an axially extending opening for receiving a shaft upon which pinion gears are mounted. Upon actuation of the clutch assembly, the thrust block is effective to transmit forces from one side gear to the other side gear.

SUMMARY OF THE PRESENT INVENTION

The present invention provides an improved differential drive mechanism which includes a clutch assembly having a pair of disc packs. When a predetermined speed of relative rotation occurs between input and output members to the differential drive mechanism, the clutch assembly is actuated to press clutch discs in a first one of the disc packs into tight frictional engagement. A force is transmitted from a side gear adjacent to this first disc pack to a side gear adjacent to a second disc pack by a thrust block arrangement. The force applied against the side gear by the thrust block arrangement is utilized to press clutch discs in the second disc pack into tight frictional engagement.

The thurst block engagement includes a pair of generally circular thrust blocks having outer surfaces which are disposed in abutting engagement with the two side gears. Inner surfaces of the thrust blocks are disposed in abutting engagement with each other. The thrust blocks extend through a circular opening in a spider member which carries a plurality of pinion gears.

Accordingly, it is an object of this invention to provide a differential drive assembly which includes a pair of side gears, a clutch assembly having a pair of disc packs which are utilized to retard relative rotation between input and output members to the differential drive assembly, and a thrust block arrangement for transmitting a disc pack actuating force from one side gear to the other side gear independently of the pinion gears.

Another object of this invention is to provide a new and improved differential drive assembly which includes a thrust block arrangement for transmitting force from one side gear to another side gear independently of pinion gears in a differential gear train and wherein the thrust block arrangement includes a first thrust block disposed in abutting engagement with one of the side gears and a second thrust block disposed in abutting engagement with the other side gear and the first thrust block.

Another object of this invention is to provide a new and improved differential drive assembly which includes a spider associated with a plurality of pinion gears disposed in meshing engagement with side gears and wherein a thrust block arrangement for transmitting forces between the two side gears extends through an opening in the spider.

BRIEF DESCRIPTION OF THE DRAWINGS

The foregoing and other objects and features of the present invention will become more apparent upon a consideration of the following description taken in connection with the accompanying drawings wherein.

DESCRIPTION OF A SPECIFIC PREFERRED EMBODIMENT OF THE INVENTION

Figure 1:
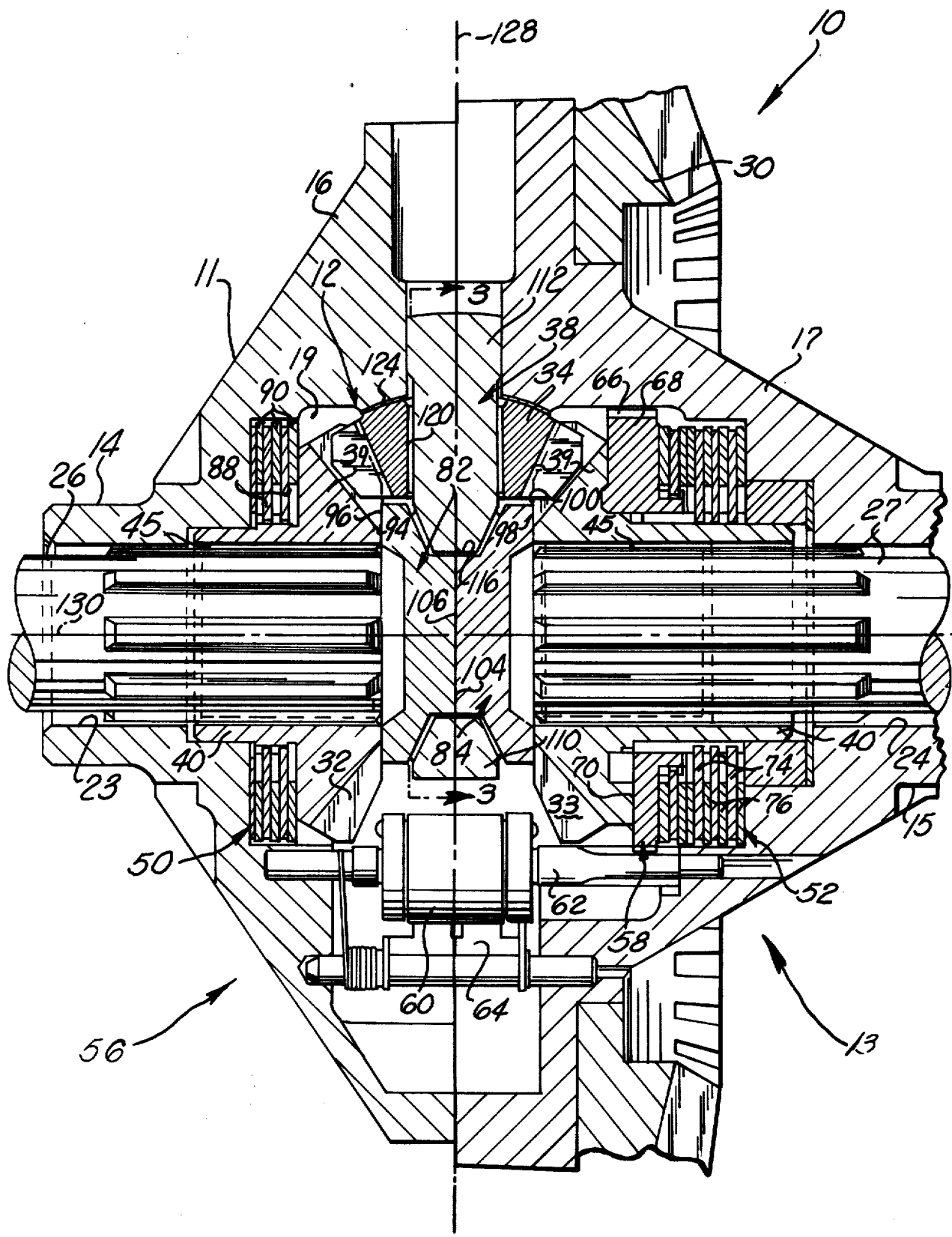
FIG. 1 is a sectional view of a differential drive mechanism constructed in accordance with the present invention.

A differential drive mechanism 10 constructed in accordance with the present invention is illustrated in FIG. 1 and is particularly well adapted for use in driving ground-engaging traction wheels of an automotive vehicle. The differential drive mechanism 10 comprises, in general, a rotatable planet gear carrier 11, a differential gear train 12, and a clutch assembly 13 which is operable to retard rotation of at least one of the gears of the gear train 12 relative to the carrier 11. The carrier 11 includes a pair of support portions 14 an 15 which are adapted to be received in bearings of a supporting structure, such as an axle housing, not shown, by which the carrier 11 is rotatably supported. The carrier 11 further includes a pair of members 16 and 17 which are suitably secured together and which define a gear chamber 19 in which the gear train 12 and clutch assembly 13 are located. The support portions 14 and 15 of the carrier 11 are formed on opposite ends of the members 16 and 17, respectively, and are provided with axial openings 23 and 24, respectively, extending therethrough. The openings 23 and 24 are disposed in an aligned relation on a common axis which is also the rotational axis of the carrier 11. The axial openings 23 and 24 communicate with the chamber 19 and receive or accomodate the driven or power or output means as represented by axle shafts 26 and 27, respectively, whose outer end portions are connected with the traction wheels or the like not shown, and whose inner or adjacent end portions are connected with gear train 12, as is described presently.

The differential drive mechanism 10 includes a conventional ring gear 30 which is mounted on the carrier 11 by means of connecting screws. A suitable drive pinion, not shown, meshes with the ring gear 30 and upon rotation effects rotation of the ring gear 30 to rotate the carrier 11.

Figure 3:
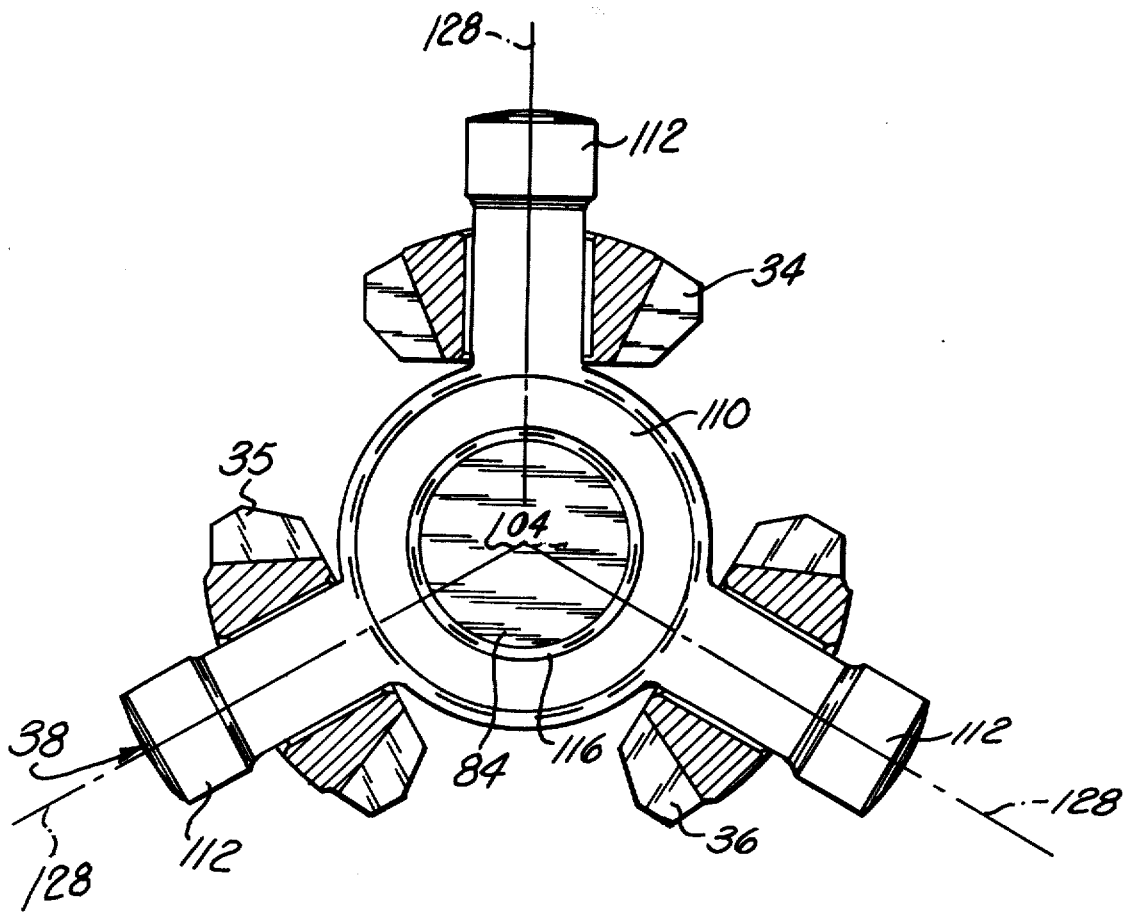
FIG. 3 is a fragmentary view, taken generally along line 3—3 of FIG. 1 depicting the relationship between a plurality of pinion gears and a spider member on which they are rotatably disposed.

The gear train 12 is operable to transmit the rotary motion of the carrier 11 to the output shaft 26 and 27. The gear train 12 includes a pair of beveled side gears 32 and 33 and a plurality of pinion gears 34, 35, and 36 (see FIG. 3) which are disposed in meshing engagement with the side gears 32 and 33 to drivingly interconnect the side gears. The pinion gears 34, 35, and 36 are rotatably supported by the carrier 11 by means of a spider member 38 which extends across the gear chamber 19 and is secured to the carrier 11.

The side gears 32 and 33 and the pinion gears 34, 35, and 36 are, in a preferred embodiment, all beveled gears of conventional form as far as the teeth thereof are concerned, and the tooth profiles are of conventional shape having pressure angle values coming within the usual range of such values. The side gears 32 and 33 while in the preferred embodiment, comprise beveled gears, may take other known forms and each of the gears 32 and 33 includes an annular body 39 having teeth formed thereon in a central hollow sleeve 40 connected with the body and extending coaxially with the axis of rotation of the side gears 32 and 33. The hollow sleeves 40 support the side gears 32 and 33 for both axial and rotational movement relative to the carrier 11. The side gears 32 and 33 are provided with splines 45 in a central opening thereof which are engaged by corresponding splines formed on the inner ends of the axle shafts 26 and 27, respectively, for drivingly connecting the shafts 26 and 27 and the side gears 32 and 33. Thus, the splined sleeves are power output members for the gear train 12.

The clutch assembly 13 includes a pair of disc packs 50 and 52. When the clutch assembly 13 is disengaged, the disc packs 50 and 52 are ineffective to retard relative rotation between the side gears 32 and 33 and carrier 11. However, upon actuation of the clutch assembly 13 to the engaged condition the disc packs 50 and 52 retard relative rotation between the side gears 32 and 33 and the carrier 11. The disc packs 50 and 52 are disposed in a coaxial relationship with the side gears 30 and 32 and axle shafts 26 and 27.

The clutch assembly 13 is normally in a disengaged condition in which the side gears 32 and 33 are free to rotate relative to the carrier 11. However, upon the occurrence of a predetermined speed of relative rotation between the carrier 11 and the side gear 33, a centrifugal actuator 56 actuates a cam or wedge arrangement 58 to press clutch discs of the disc pack 52 into tight frictional engagement. The actuator assembly 56 includes a pair of fly weights 60 which are connected with a rotatable drive pin 62. The fly weights 60 are spring loaded inwardly so that in the absence of centrifugal force they do not engage a stop or tab 64. However, upon the occurrence of a predetermined speed of relative rotation between the side gear 33 and carrier 11, gear teeth 66 on a wedge member 68 rotate drive pin 62 with sufficient speed to cause the fly weights 60 to engage the stop tab 64. When the fly weights 60 engage stop tab 64, the pin 62 is held against rotation.

Since the pin 62 is held against rotation, the wedge member 68 is held against rotation with the side gear 33. This causes an undulating cam surface 70 disposed on the side gear 33 to force the wedge member 68 axially toward the right (as viewed in FIG. 1). This rightward movement of the wedge member 68 presses the discs in the disc pack 52 into tight frictional engagement.

Some of the discs 74 in the disc pack 52 are held against rotation relative to the side gear 33 by a splined interconnection. Other clutch discs 76 are held against rotation relative to the carrier 11 by a splined connection between these discs and the housing. Therefore, when the clutch discs 74 and 76 are pressed into tight frictional engagement, relative rotation is retarded between the side gear 33 and the carrier 11. The construction and mode of operation of the clutch actuator assembly 56, disc pack 52, wedge member 78, and surface 70 are the same as are disclosed in U.S. Pat. No. 3,606,803 to Ottemann and entitled "Centrifugal Actuator for Limited Slip Differential." Therefore, the interaction of these components will not be further described herein to avoid prolixity of description.

In accordance with one feature of the present invention, a pair of thrust blocks 82 and 84 are efficient to transmit an axial force from the side gear 33 to the side gear 32 independently of the pinion gears 34, 35, and 36 when the clutch assembly 13 are actuated. Upon actuation of the clutch assembly 13, the interaction between the wedge member 68 and cam surface 70 on the side gear 33 causes the axially movable side gear 33 to be pressed toward the left (as viewed in FIG. 1). This results in the application of an axial force against the thrust block 84. The thrust block 84 is then effective to press the adjacent thrust block 82 toward the left (as viewed in FIG. 1) against the axially movable side gear 32. This axial force is then transmitted from the side gear 32 to the disc pack 50.

The disc pack 50 includes a plurality of clutch discs 88 which are connected with the side gear 32 by a suitable spline connection. Other clutch discs 90 are connected with the carrier 11 by a spline connection. When an axial force is applied to the side gear 32, it is urged toward the left (as viewed in FIG. 1) to press the clutch discs 88 and 90 into firm frictional engagement. This frictional engagement of the clutch discs 88 and 90 retards relative rotation between the side gear 32 and the carrier 11. Of course as this is occurring, the disc pack 52 is pressurized by the wedge arrangement 58 to retard relative rotation between the side gear 33 and carrier 11.

Figure 2:
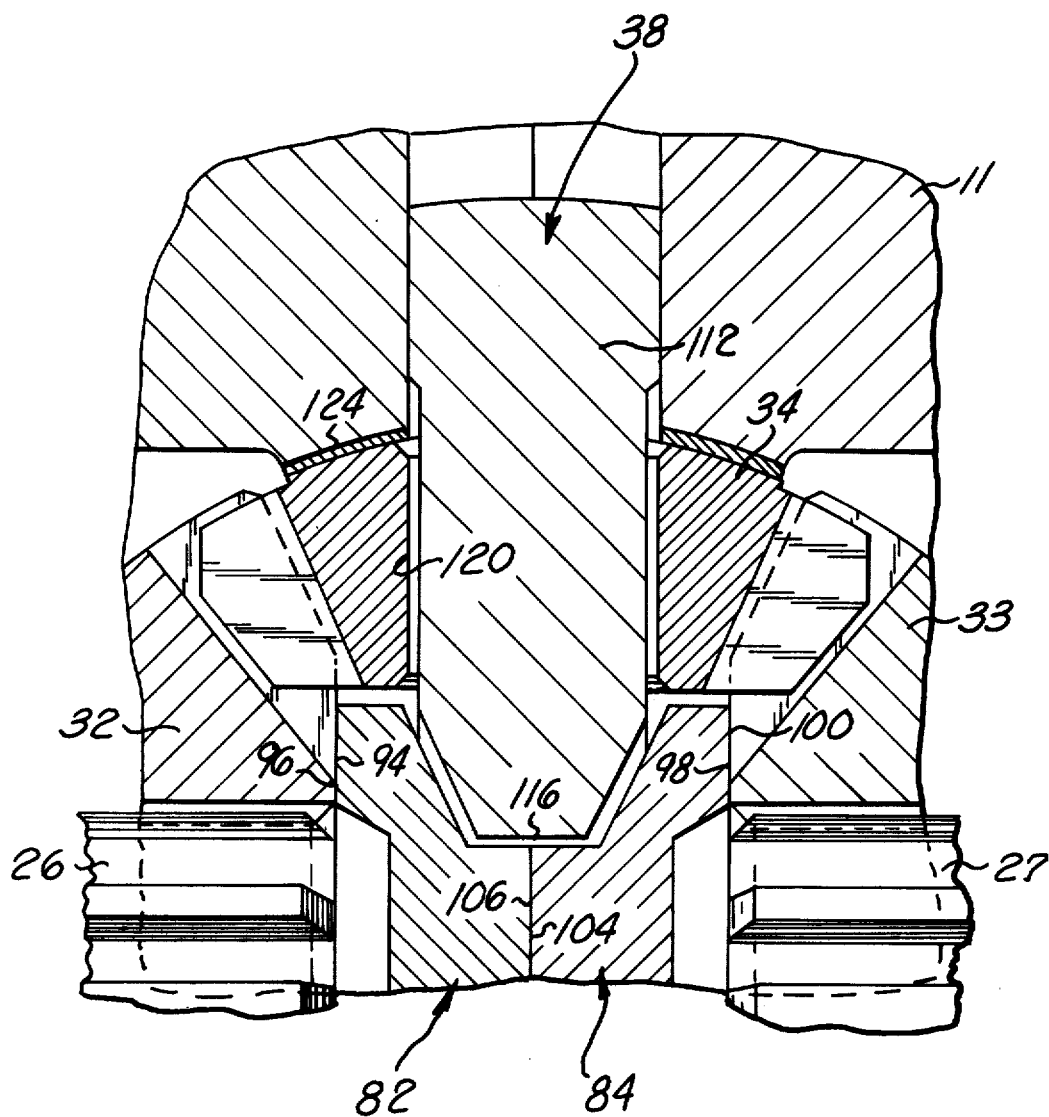
FIG. 2 is an enlarged fragmentary sectional view illustrating the relationship between a pair of side gears, a pinion gear, and a pair of thrust blocks in the differential drive mechanism of FIG. 1.

The thrust block 82 has an annular end face 94 (see FIG. 2) which is disposed in abutting engagement with an annular end surface 96 of the side gear 32. Similarly, an annular end face 98 of the thrust block 84 is disposed in abutting engagement with an annular end face 100 of the side gear 33. The thrust block 84 has a flat circular surface 104 which is disposed in abutting engagement with a flat circular surface 106 of the thrust block 82. The thrust blocks 82 and 84 are selected at assembly to provide a small total axial clearance between the thrust blocks and the side gears 32 and 33 of, for example, 0.004 inches or less. This insures that axial forces applied to the thrust block 84 by the side gear 33 are transmitted by the thrust block 82 to the side gear 32.

The spider 38 is associated with the pinion gears 34, 35, and 36 and has an annular central body 110 (see FIG. 3) and a plurality of radially outwardly projecting legs 112 upon which the pinion gears 34, 35, and 36 are disposed. The annular central body 110 of the spider 38 defines a circular opening 116 through which the thrust blocks 82 and 84 extend (see FIG. 2). There is a clearance between the spider 38 and the thrust blocks 82 and 84 so that the thrust blocks are free to move or float axially relative to the spider 38 under the influence of axially directed forces applied to the thrust blocks 82 and 84 by the side gear 33. This floating arrangement of the thrust blocks 82 and 84 relative to the spider 38 insures that the thrust blocks are effective to transmit forces directly from the side gear 33 to the side gear 32 to engage the disc pack 50 simultaneously with engagement of the disc pack 52.

The pinion gear 34 is constructed so that there is backlash between the pinion gear and the two side gears 32 and 33. To insure that actuating force is not transmitted through the teeth of the pinion gears 34, there is a larger than normal amount of backlash between the pinion gear 34 and the side gear 33. Therefore, axial movement of the side gear 33 under the influence of the wedge arrangement 58 does not result in an overloading of the pinion gear 34. It should be noted that there is some backlash between the pinion gear 34 and the side gear 32. However, the backlash between the pinion gear 34 and the side gear 32 is not as great as is the backlash between the pinion gear and the side gear 33. The pinion gears 35 and 36 are associated with the side gears 32 and 33 in the same manner as is the pinion gear 34. Thus, there is a greater amount of backlash between the side gear 33 and the pinion gears 35 and 36 than there is between the side gear 32 and the pinion gears 35 and 36. This is to compensate for the relatively larger amount of axial movement of side gear 33 during actuation of the clutch mechanism 13. In essence, side gear 33 must move an axial distance sufficient to take up the slack due to tolerances, clearances and/or wear in the total stack up of clutch plates, side gear, thrust blocks, side gear cam and clutch plates when going from left to rignt in FIG. 1. Further, this must be done without causing undue interference between the teeth of side gear 33 and pinion 34.

The pinion gears 34, 35, and 36 are free to move axially relative to the legs 112 of the spider 38. Thus, the pinion gear 34 has a central opening 120 which is of a greater diameter than the diameter of the leg 112 about which it rotates. The interaction between the pinion gear 34 and the side gears 32 and 33 presses the pinion gear 34 against a thrust washer 124 (FIG. 2) located between the pinion gear 34 and the carrier 11. It should be noted that the legs 112 of the spider 38 have central axes 128 which intersect at a central axis 130 of the drive shafts 26, 27, side gears 32 and 33, and thrust blocks 82 and 84. This intersection is disposed along the line of engagement of the surfaces 104 and 106 of the thrust blocks 82 and 84.

In view of the foregoing description, it can be seen that t the differential drive mechanism 10 includes a rotatable input member or ring gear 30 which is fixedly connected with the carrier 11. The differential gear train 12 drivingly connects the ring gear 30 and carrier 11 with the axle shafts 26 and 27. The differential drive train 12 includes a pair of side gears 32 and 33 which are disposed in meshing engagement with three pinion gears 34, 35, and 36.

Upon actuation of an actuator 56, a cam arrangement 58 presses clutch discs 74 and 76 of a disc pack 52 into tight frictional engagement to retard relative rotation between the carrier 11 and side gear 33. In addition, this cam arrangement presses the side gear 33 toward the left (as viewed in FIG. 1) against the thrust block 84. The thrust block 84 in turn presses the thrust block 82 against the side gear 32. The pressure exerted by the thrust block 82 against the side gear 32 compresses the clutch discs 88 and 90 of the disc pack 50 to thereby retard relative rotation between the side gear 32 and the carrier 11.

Although the actuator 56 has been described herein as being of the same construction as is disclosed in U.S. Pat. No. 3,606,803, it should be understood that other types of actuators could be utilized if desired. For example, the roller clutch actuator disclosed in U.S. Pat. No. 3,324,744 could be used. It should also be understood that although a specific type of differential gear train 12 has been illustrated herein, it is contemplated that other types of differential gear trains could be utilized if desired.

Having described a specific preferred embodiment of the invention, the following is claimed:

1. A differential drive assembly comprising a rotatable input member, a rotatable output member, differential gear means for drivingly connecting said input member with said output member and for enabling relative rotation to occur between said input and output members, said differential gear means including first and second axially movable side gears rotatable about their respective central axes and a pinion gear disposed in meshing engagement with said side gears, clutch means operable between an actuated condition in which said clutch means is effective to retard relative rotation between said input and output members and an unactuated condition in which said clutch means is ineffective to retard relative rotation between said input and output members, said clutch means including a first group of clutch discs disposed adjacent to said first side gear, a second group of clutch discs disposed adjacent to said second side bear, and means for applying force to said first side gear and said first group of clutch discs to press said first group of clutch discs into tight frictional engagement when said clutch means is in the actuated condition, force transmitting means for pressing said second group of clutch discs into tight frictional engagement when said clutch means is in the actuated condition, said force transmitting means including thrust block means spaced radially inward with respect to said side gear axes from said pinion gear and being free to rotate about said side gear axes independent of said pinion gear wherein said pinion gear and said first side gear mesh in such a manner as to have a first amount of backlash therebetween, and said pinion gear and said second side gear mesh in such a manner as to have a second amount of backlash therebetween, said first amount of backlash being greater than said second amount of backlash.

2. A differential drive assembly as set forth in claim 1 further including means for supporting said first and second side gears for rotation about a common central axis and independent of said thrust block means, said first and second side gears having end surfaces extending transversely to said central axis, said thrust block means being disposed between said first and second side gears in radially and rotationally sliding abutting engagement with said end surfaces for transmitting force from said first side gear to said second side gear when said clutch means is in the actuated condition.

3. A differential drive assembly as set forth in claim 2 wherein said thrust block means comprises first and second thrust blocks in radially and rotationally abutting engagement with each other.

4. A differential drive assembly comprising a rotatable input member, a rotatable output member, differential gear means for drivingly connecting said input member with said output member and for enabling relative rotation to occur between said input and output members, said differential gear means including first and second side gears rotatable about their central axes and a rotatable pinion gear disposed in meshing engagement with said side gears, clutch means operable between an actuated condition in which said clutch means is effective to retard relative rotation between said input and output members and an unactuated condition in which said clutch means is ineffective to retard relative rotation between said input and output members, said clutch means including means for applying force to said first side gear when said clutch means is in the actuated condition, and force transmitting means for transmitting force from said first side gear to said second side gear independently of said pinion gear when said clutch means is in the actuated condition, said force transmitting means including a first thrust block disposed in radially and rotationally sliding abutting engagement with said first side gear and second thrust block disposed in radially and rotationally sliding abutting engagement with said second side gear and said first thrust block both of said thrust blocks being spaced radially inward with respect to said side gear axes from said pinion gear and being free to rotate about said side gear axes independent of said pinion gear.

5. A differential drive assembly comprising a rotatable input member, a rotatable output member, differential gear means for drivingly connecting said input member with said output member and for enabling relative rotation to occur between said input and output members, said differential gear means including first and second axially movable side bears rotatable about their central axes, spider means for positioning a plurality of pinion gears, and a plurality of pinion gears rotatably disposed on said spider means in meshing engagement with said side gears, said spider means including means for defining an opening having a central axis disposed in a coaxial relationship with the central axes of said side gears, clutch means operable between an actuated condition in which said clutch means is effective to retard relative rotation between said input and output members and an unactuated condition in which said clutch means is ineffective to retard relative rotation between said input and output members, said clutch means including a first group of clutch discs disposed adjacent to and in a coaxial relationship with said first side gear, a second group of clutch discs disposed adjacent to and in a coaxial relationship with said second side gear, and means for applying force to said first side gear and said first group of clutch discs to press said first group of clutch discs into tight frictional engagement when said clutch means is in the actuated condition, and force transmitting means for pressing said second group of clutch discs into tight frictional engagement when said clutch means is in the actuated condition, said force transmitting means including thrust block means extending between said side gears through said opening and being spaced radially inwardly along said spider central axis from said spider in a coaxial relationship with said first and second side gears and wherein said pinion gears and said first side gear mesh in such a manner as to have a first amount of backlash therebetween, and said pinion gears and said second side gear mesh in such a manner as to have a second amount of backlash therebetween, said first amount of backlash being greater than said second amount of backlash.

* * * * *